US008761823B2

(12) United States Patent
Shuman et al.

(10) Patent No.: US 8,761,823 B2
(45) Date of Patent: Jun. 24, 2014

(54) DETERMINING SESSION SETUP LATENCY IN A WIRELESS COMMUNICATIONS SYSTEM

(75) Inventors: Mohammed Ataur Rahman Shuman, San Diego, CA (US); Ashutosh Aggarwal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1083 days.

(21) Appl. No.: 12/718,670

(22) Filed: Mar. 5, 2010

(65) Prior Publication Data

US 2010/0248770 A1    Sep. 30, 2010

Related U.S. Application Data

(60) Provisional application No. 61/163,287, filed on Mar. 25, 2009.

(51) Int. Cl.
*H04B 7/00* (2006.01)
(52) U.S. Cl.
USPC ........ 455/518; 455/519; 455/416; 455/67.11; 455/41.2; 455/3.05; 455/90.2; 370/260; 370/276; 370/312; 370/395.2; 379/202.01; 718/100
(58) Field of Classification Search
USPC ......... 455/518, 509, 519, 403, 405, 416, 418, 455/41.2, 3.05, 90.2, 67.11, 67.13; 370/260, 261, 270, 276, 310, 312, 352, 370/389, 395.2; 379/202.01, 88.19; 718/100
See application file for complete search history.

(56) References Cited

U.S. PATENT DOCUMENTS

| 2005/0090228 A1* | 4/2005 | Black ........................... 455/405 |
| 2006/0019681 A1* | 1/2006 | Harris et al. .................. 455/464 |
| 2006/0172752 A1 | 8/2006 | Harris et al. |

OTHER PUBLICATIONS

International Search Report, PCT/US2010/027208, International Searching Authority, European Patent Office, May 3, 2010.
Written Opinion, PCT/US2010/027208, International Searching Authority, European Patent Office, May 3, 2010.

* cited by examiner

*Primary Examiner* — Shaima Q Aminzay
(74) *Attorney, Agent, or Firm* — Raphael Freiwirth

(57) ABSTRACT

In an embodiment, a given access terminal (AT) detects a request to initiate a Push-to-Talk (PTT) session, and stores first time information indicative of when the request to initiate the PTT session is detected. The given AT sends the request as a message to an access network, which forwards an announce message to announce the PTT session to a plurality of access terminals. At least one of the plurality ATs accepts the announce message to join the PTT session, and the access network sends a message to the given AT granting permission to begin the PTT session. The given AT stores second time information indicative of when the permission is received, and sends PTT latency information based on the first and second time information to the access network, the PTT latency information related to an initial PTT latency of the PTT session.

67 Claims, 9 Drawing Sheets

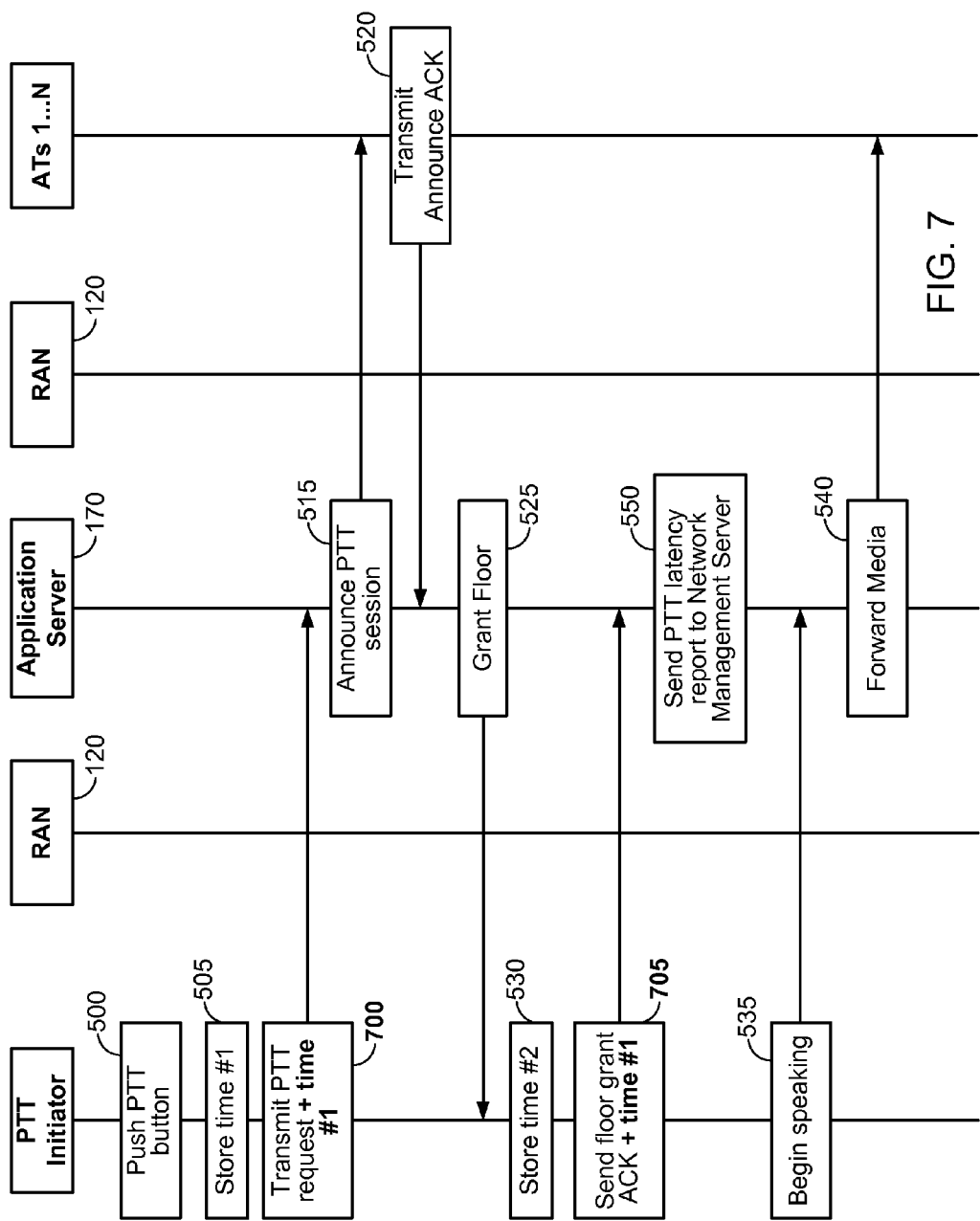

DETERMINING SESSION SETUP LATENCY IN A WIRELESS COMMUNICATIONS SYSTEM

CLAIM OF PRIORITY UNDER 35 U.S.C. §119

The present Application for Patent claims priority to Provisional Application No. 61/163,287 entitled "DETERMINING LATENCY IN A WIRELESS COMMUNICATIONS SYSTEM" filed Mar. 25, 2009, and assigned to the assignee hereof and hereby expressly incorporated by reference herein.

BACKGROUND OF THE INVENTION

1. Field of the Invention

Embodiments of the present invention are directed to determining latency in a wireless communications, and more particularly to determining an initial Push-to-Talk (PTT) latency in a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service operators and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, a given access terminal (AT) detects a request to initiate a Push-to-Talk (PTT) session, and stores first time information indicative of when the request to initiate the PTT session is detected. The given AT sends the request as a message to an access network, which forwards an announce message to announce the PTT session to a plurality of access terminals. At least one of the plurality ATs accepts the announce message to join the PTT session, and the access network sends a message to the given AT granting permission to begin the PTT session. The given AT stores second time information indicative of when the permission is received, and sends PTT latency information based on the first and second time information to the access network, the PTT latency information related to an initial PTT latency of the PTT session.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 7 illustrates another PTT latency information reporting process according to an embodiment of the present invention.

DETAILED DESCRIPTION

Figure 1:
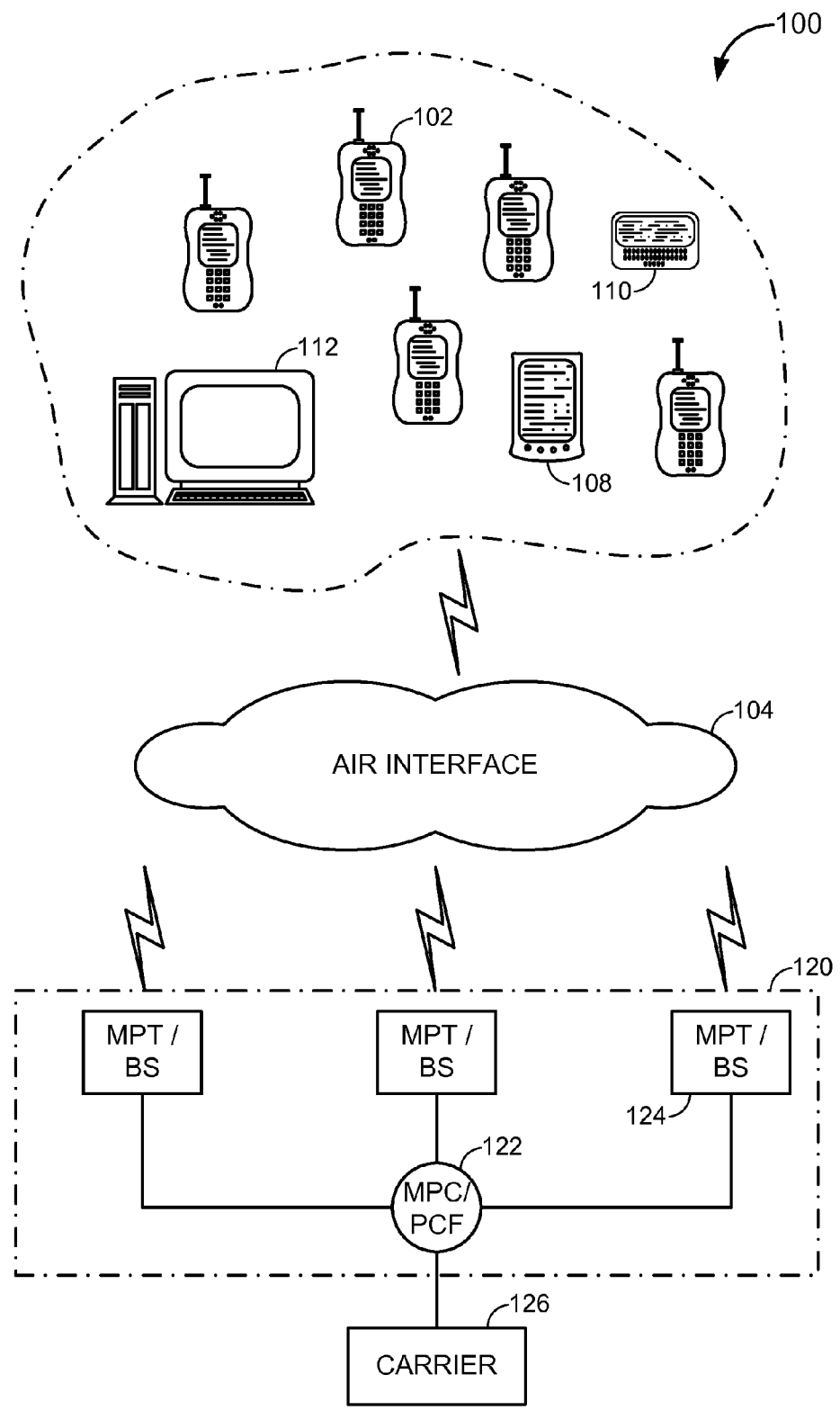
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
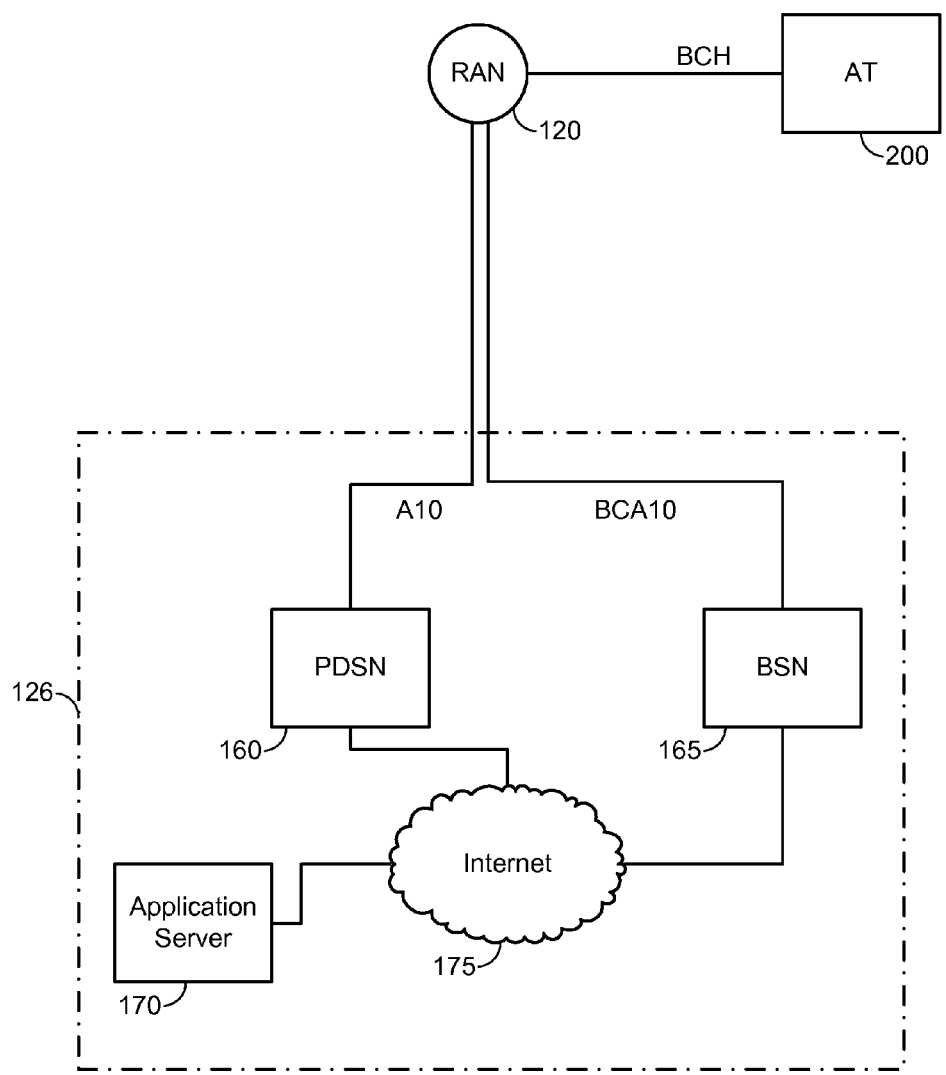
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
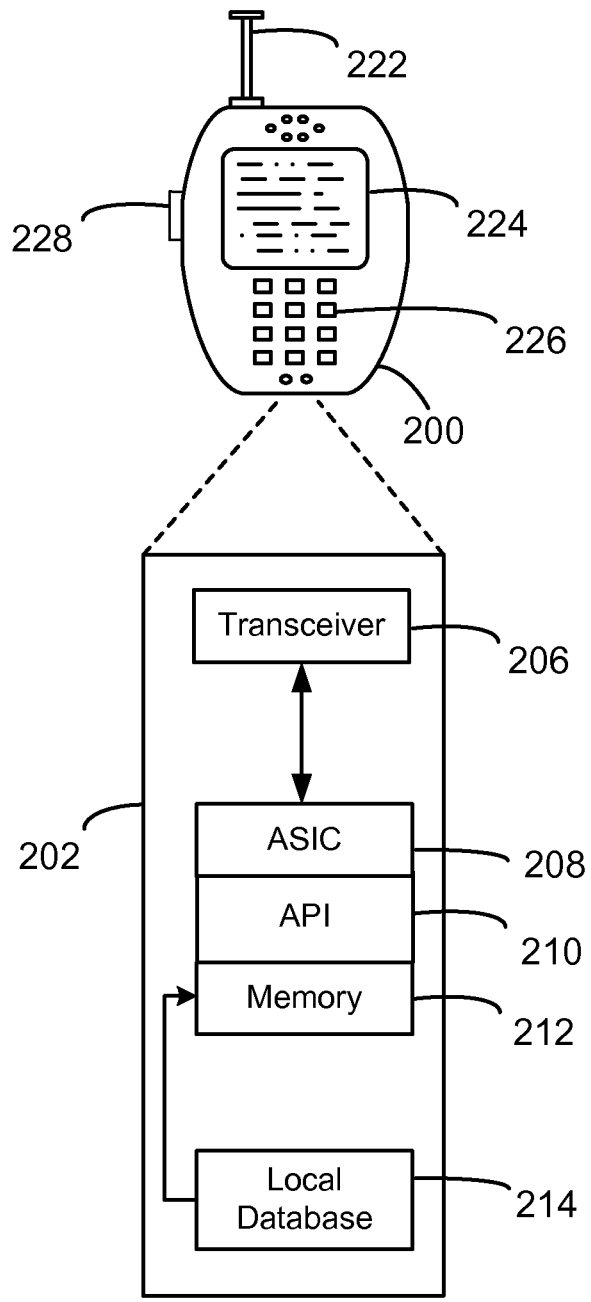
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Conventional Logging of Initial PTT Latency

Figure 4A:
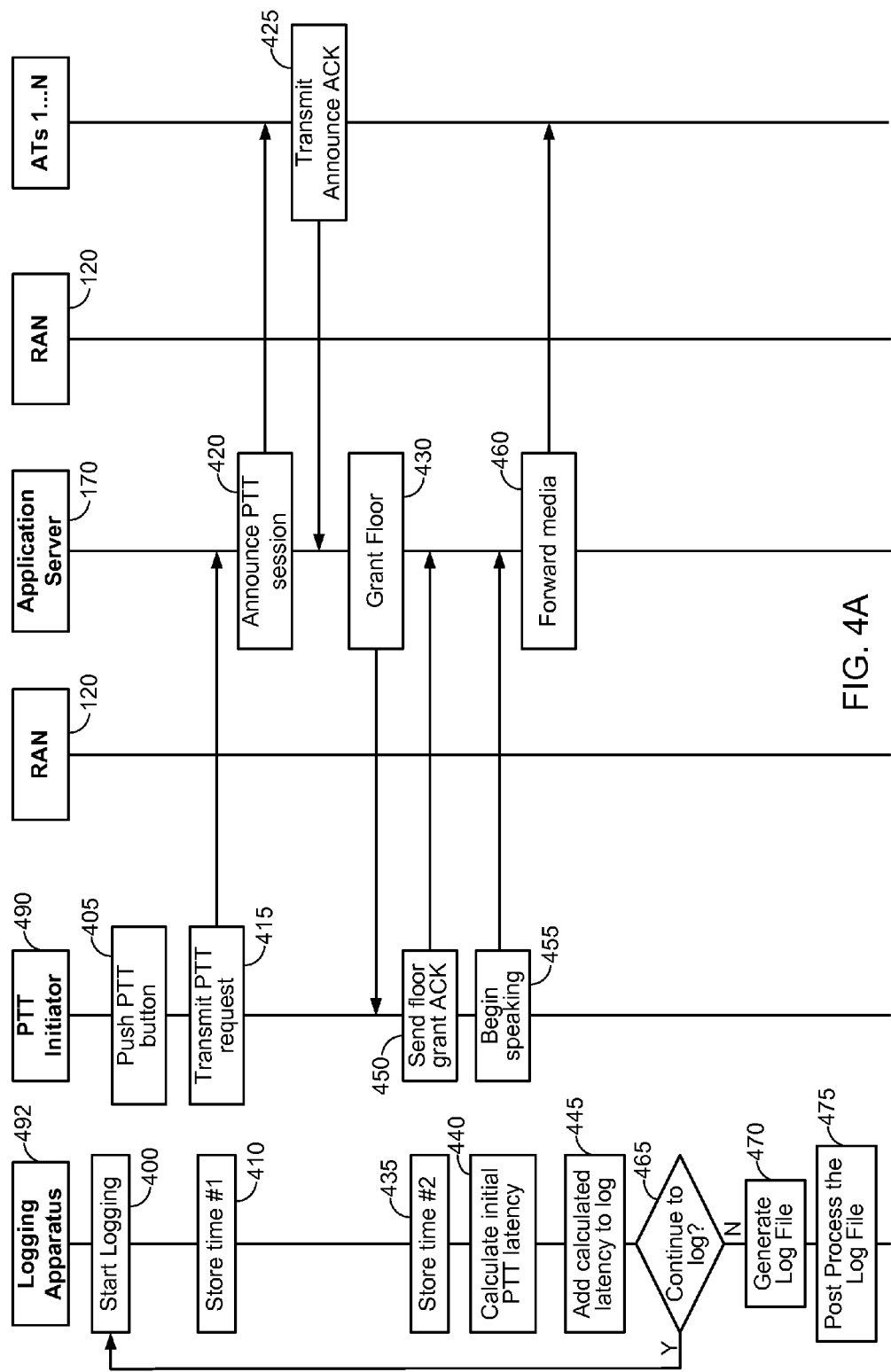
FIG. 4A illustrates a conventional manner of calculating initial Push-to-Talk (PTT) latencies in the wireless communications system of FIG. 1.

FIG. 4A illustrates a conventional manner of calculating and logging initial Push-to-Talk (PTT) latencies in the wireless communications system 100 of FIG. 1. As used herein, the initial PTT latency means the time differential between (i) a user of a PTT communication device pushing a button (or otherwise selecting a PTT triggering option) that triggers the transmission of a request to initiate a PTT call and (ii) the PTT device outputting a tone indicating that the user may begin speaking to at least one listener. Alternatively, the time differential can correspond to the time between (i) the button push and (ii) a time when a floor grant message is received at the PTT device. In any case, the time differential between the tone output and floor grant receipt is relatively small.

Figure 4B:
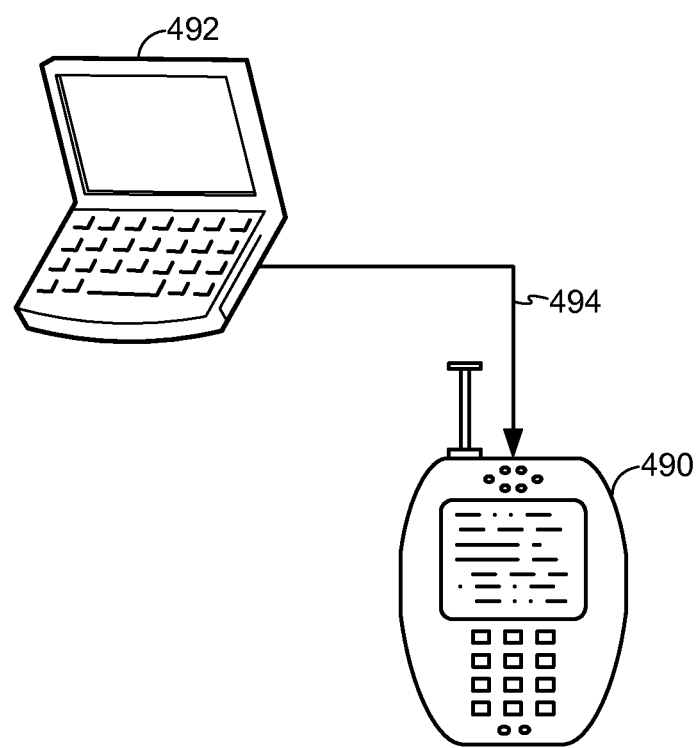
FIG. 4B illustrates a conventional PTT latency test device arrangement that includes an access terminal, a logging apparatus and a connection connecting the access terminal and logging apparatus.

As will be appreciated by one of ordinary skill in the art, it is typical in PTT communication systems to compile data indicative of PTT latency because initial PTT latency is a critical factor in PTT communications. The conventional manner of gathering initial PTT latency information, described below in FIG. 4A, is by distributing test phones, which are access terminals connected to a logging apparatus, such as illustrated in FIG. 4B, that logs the initial PTT latency information.

Accordingly, FIG. 4A is described below as implemented within the system 100 of FIG. 1 with the access terminal 490 of FIG. 4B. Referring to FIG. 4B, the access terminal 490, which is a PTT initiator in FIG. 4A, is connected to a logging apparatus 492 via a connection 494. In an example, the logging apparatus 492 can be a desktop or laptop computer. The connection 494 that connects the logging apparatus 492 to the access terminal 490 can be any type of well-known connection, such as USB, Bluetooth, a proprietary connection, etc.

Referring to FIG. 4A, in 400, the logging apparatus 492 starts logging the initial PTT latencies for PTT calls made by the PTT initiator 490, and thereby monitors the PTT initiator 490 and waits for a user of the PTT initiator 490 to push the PTT button. In 405, the user of the PTT initiator 490 pushes the PTT button to request initiation of a PTT session. The logging apparatus 492 detects the push of the PTT button, and stores a first timestamp that approximates the time of the detected PTT button push, 410. The PTT initiator 490 transmits a PTT request to the application server 170 via the RAN 120, 415. In 420, the application server 170 (e.g., a PTT server, such as a Qchat server) forwards an announce message to the RAN 120, and the RAN 120 transmits the announce message to ATs 1 . . . N (e.g., multicast group members that are interested in the announced PTT session).

After a first of ATs 1 . . . N decodes the announce message and determines to accept the PTT call, the AT (i.e., the "first responder") transmits an announce acknowledgment (ACK) to the RAN 120, and the RAN 120 forwards the announce ACK to the application server 170, 425. Upon receiving a first announce ACK from ATs 1 . . . N, the application server 170 sends a floor grant signal to the PTT initiator, 430, to inform the user of the PTT initiator 490 that at least one listener has joined the PTT call, such that the user can begin speaking.

Upon a detection that the PTT initiator 490 has received the floor grant message, or alternatively upon a detection that the PTT initiator 490 has output a tone indicative of the PTT floor grant in response to the floor grant message, the logging apparatus 492 stores a second timestamp that approximates the time of the detection, 435, calculates the initial PTT latency by taking a difference between the first and second timestamps, 440 and adds the calculated initial PTT latency to a PTT latency log maintained for the PTT initiator 490, 445. Alternatively, the calculating step of 440 need not be performed at the logging apparatus 492. In this case, step 445 may merely add the recorded time stamps to the log, and the calculation of the initial PTT latency can be offloaded to the application server 170, for example, or to whichever entity is responsible for post-processing the log file.

The PTT initiator 490 sends a floor grant ACK to the application server 170 to acknowledge receipt of the floor grant message, 450, and the user of the PTT initiator 490 begins speaking to one or more of ATs 1 . . . N, 455. The application server 170 receives the audio packets from the PTT initiator 490, and forwards the media (e.g., audio data) to ATs 1 . . . N, 460. In an example, the forwarding of the media in 460 can be performed via unicast or multicast messaging protocols.

In 465, the logging apparatus 465 determines whether to continue to log initial PTT latencies for PTT calls of the PTT initiator 490. If the logging apparatus 492 (or a user of the logging apparatus 492) determines to continue logging, the process returns to 400, and the logging apparatus 492 continues logging and waits for a next PTT button push. Accordingly, it will be appreciated that initial PTT delay for a series of PTT calls can be captured within a single log session. Otherwise, if the logging apparatus 492 determines to cease logging, the logging apparatus 492 generates a log file, 470, and performs post-processing on the log file, 475. For example, in the post-processing, one or more output metrics of interest are generated, which may later be uploaded to an entity that can adjust system parameters based on the output metrics (e.g., a network management server (not shown)). For example, the post processing can include populating a histogram type counter, generating a cumulative distribution function and/or any generating other output metric of interest based on the logged latency samples.

As will be appreciated by one of ordinary skill in the art, deploying PTT initiators throughout a wireless communications system in different locations to gather data related to initial PTT latency is limited in a number of respects. For example, only a relatively small number of PTT initiators coupled with logging apparatuses can be deployed without significant expenses (e.g., due to hardware costs, personnel costs, etc.), there is complexity regarding the process for uploading the log files and/or post-processed output metrics, and there is also a time-lag between the initial PTT latency being logged at the logging apparatus 492 and the output metrics being collected such that operating or system parameters of the wireless communications system can be adjusted (e.g., at a network management server).

As described above, initial PTT latency information is conventionally obtained via the deployment of specialized logging equipment, which increases the complexity, expense and delay associated with obtaining the initial PTT latency information. As will now be described, embodiments of the present invention are directed to PTT latency information reporting from any access terminal within the wireless communications system 100 without the need for specialized equipment.

Figure 5:
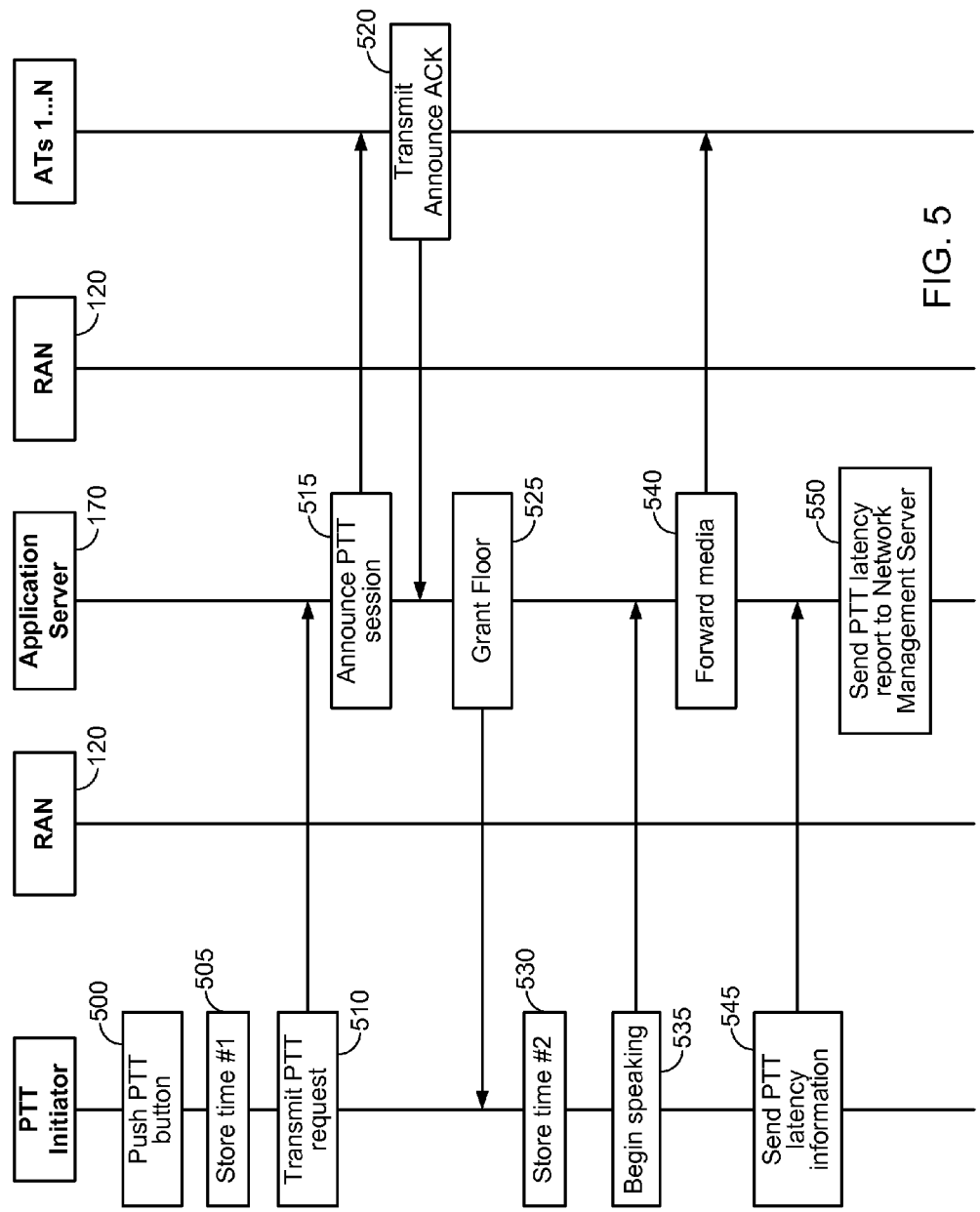
FIG. 5 illustrates a PTT latency information reporting process according to an embodiment of the present invention.

FIG. 5 illustrates a PTT latency information reporting process according to an embodiment of the present invention. Referring to FIG. 5, a user of a PTT initiator (e.g., an access terminal) pushes the PTT button to request initiation of a PTT session, 500. In contrast to FIG. 4A/4B, the PTT initiator of FIG. 5 need not be connected to a separate logging apparatus. The PTT initiator detects the push of the PTT button, and stores a first timestamp that approximates the time of the detected PTT button bush. The PTT initiator transmits a PTT request ("PTT call request message") to the application server 170 via the RAN 120, 510. In 515, the application server 170 (e.g., a PTT server, such as a Qchat server) forwards an announce message to the RAN 120, and the RAN 120 transmits the announce message to ATs 1 . . . N (e.g., multicast group members that are interested in the announced PTT session).

After a first of ATs 1 . . . N decodes the announce message and determines to accept the PTT call, the AT (i.e., the "first responder") transmits an announce acknowledgment (ACK) to the RAN 120, and the RAN 120 forwards the announce ACK to the application server 170, 520. Upon receiving a first announce ACK from ATs 1 . . . N, the application server 170 sends a floor grant signal to the PTT initiator, 525, to inform the user of the PTT initiator that at least one listener has joined the PTT call, such that the user can begin speaking.

Upon a detection that the PTT initiator has received the floor grant message, or alternatively upon a detection that the PTT initiator has output a tone indicative of the PTT floor grant in response to the received floor grant message, the PTT initiator stores a second timestamp that approximates the time of the detection, 530. The user of the PTT initiator begins speaking to one or more of ATs 1 . . . N, 535, and the application server 170 receives the audio packets from the PTT initiator, and forwards the media (e.g., audio data) to ATs 1 . . . N, 540. In an example, the forwarding of the media in 460 can be performed via unicast or multicast messaging protocols.

The PTT initiator sends PTT latency information, based on the stored first and second timestamps, to the application server 170, 545. The PTT latency information can be, in an example, an actual or mapped initial PTT latency value (e.g., the second timestamp minus the first timestamp) that is calculated at the PTT initiator (e.g., see FIG. 6A), or the first and second timestamps may be sent without a calculation of the PTT latency (e.g., see FIG. 6B).

In an example, the PTT latency information transmitted in 545 may be included within a floor grant ACK transmitted from the PTT initiator to the application server 170. In this example, the PTT latency information can be either (i) a combination of the first and second timestamps or (ii) a calculation of the initial PTT latency. Also, while the PTT latency information transmission of 545 is illustrated as occurring after the user of the PTT initiator begins speaking in 535, it will be appreciated that the floor grant ACK may be sent relatively soon after receiving the floor grant message, and as such may occur before 535 in an example.

In an alternative example, the PTT latency information can be transmitted at a later time, such as at the end of the PTT call, which may permit the PTT latency information to be bundled with additional information (e.g., call duration, etc.). In another example, irrespective of when the PTT latency information is transmitted, the PTT latency information may be bundled with additional information, such as information specific to the PTT initiator (e.g., phone type, firmware version, installed applications, whether the PTT initiator communicates via a wired or wireless connection, etc.) and/or radio information (e.g., Serving sector ID, channel conditions at the PTT initiator, etc.). After the PTT latency information is transmitted in 545, the PTT initiator need not retain the stored first and second timestamps, which may then be erased from memory.

In another example, if the PTT latency information is transmitted as a calculated latency value, the PTT latency information may be encoded with a given mapping protocol to conserve bandwidth. Table 1 (below) illustrates an example mapping protocol for the transmission of a latency value.

TABLE 1

Example Mapping Protocol for Latency Value Transmission

| Latency value range | Code |
| --- | --- |
| 0-200 ms | 00 |
| 200-600 ms | 01 |
| 600 ms-2 s | 10 |
| Timeout (no tone established) | 11 |

As shown in Table 1 (above), the PTT latency information can be conveyed to the application server 170 with two bits that correspond to three (3) latency value ranges and a timeout condition, in an example. As will be appreciated, if more precision is required by the application server 170, the number of bits and latency value ranges can be augmented. Also, while not shown, in another example, if the PTT latency information is transmitted as first and second timestamps, each of the timestamps may be encoded with a given mapping protocol to conserve bandwidth (e.g., such that a reduced number of bits indicates a given range of time).

After the PTT latency information is transmitted 545, the application server 170 receives the PTT latency information and then generates and sends a PTT latency report, 550, to a network management server (not shown), as will now be described in greater detail with respect to FIGS. 6A and 6B. Alternatively, instead of the "push" implementation wherein the application server 170 initiates report generation and transmission to the network management server, a "pull" implementation can be deployed wherein the application server 170 generates and forwards the report (or any other requested information) in response to a request from the network management system.

Figure 6A:
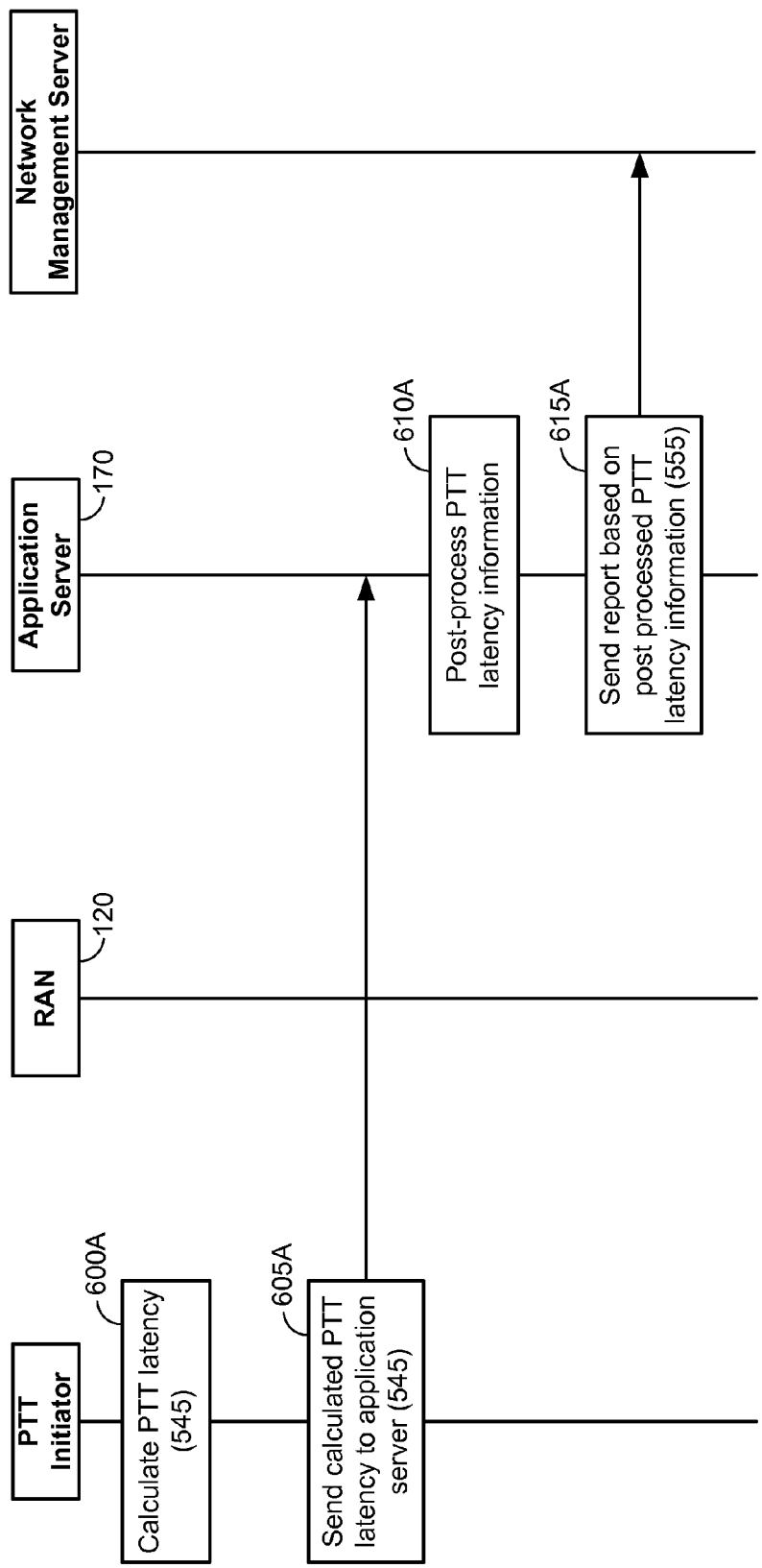
FIGS. 6A and 6B illustrate different ways PTT latency information can be transmitted and post-processed according to embodiments of the present invention.

Referring to FIG. 6A, the PTT initiator calculates the initial PTT latency of the PTT call, 600A, and sends the calculated PTT latency to the application server 170 (e.g., via a mapping protocol as in Table 1), 605A. As will be appreciated, 600A and 600B of FIG. 6A correspond to 545 of FIG. 5. In 610A, the application server 170 performs post-processing upon the received PTT latency information, as in 475 of FIG. 4, to generate one or more output metrics of interest (e.g., a histogram type counter, a cumulative distribution function, etc.). The application server 170 then generates a report based on the post-processed PTT latency information, and transmits the generated report to the network management server, 615A. Again, the report transmission of 615A may alternatively be triggered by a request from the network management server (e.g., "pull" instead of "push"), and need not be independently performed by the application server 170 without such a request in at least one embodiment. The network management server may then adjust system parameters based on the initial PTT latency feedback provided in the generated report.

Further, additional information such as serving sector, system load, phone type, access technology can be leveraged by the application server 170 or the network management system to better interpret the system performance. This information can be, for example, acquired at the application server 170 and passed to the network management system via the report discussed above.

Referring to 6B, the PTT initiator sends the first and second timestamps to the application server 170, 600B. As will be appreciated, 600B of FIG. 6B corresponds to 545 of FIG. 5. In 605B, the application server 170 calculates the PTT latency based on the first and second timestamps, and sends generates a report based on the calculated PTT latency without post-processing, and transmits the generated report to the network management server, 610A. Again, the report transmission of 610A may alternatively be triggered by a request from the network management server (e.g., "pull" instead of "push"), and need not be independently performed by the application server 170 without such a request in at least one embodiment. The network management server may then perform the post-processing based on the calculated PTT latency, 615B, and if necessary, adjust system parameters based on post-processing.

Figure 6B:
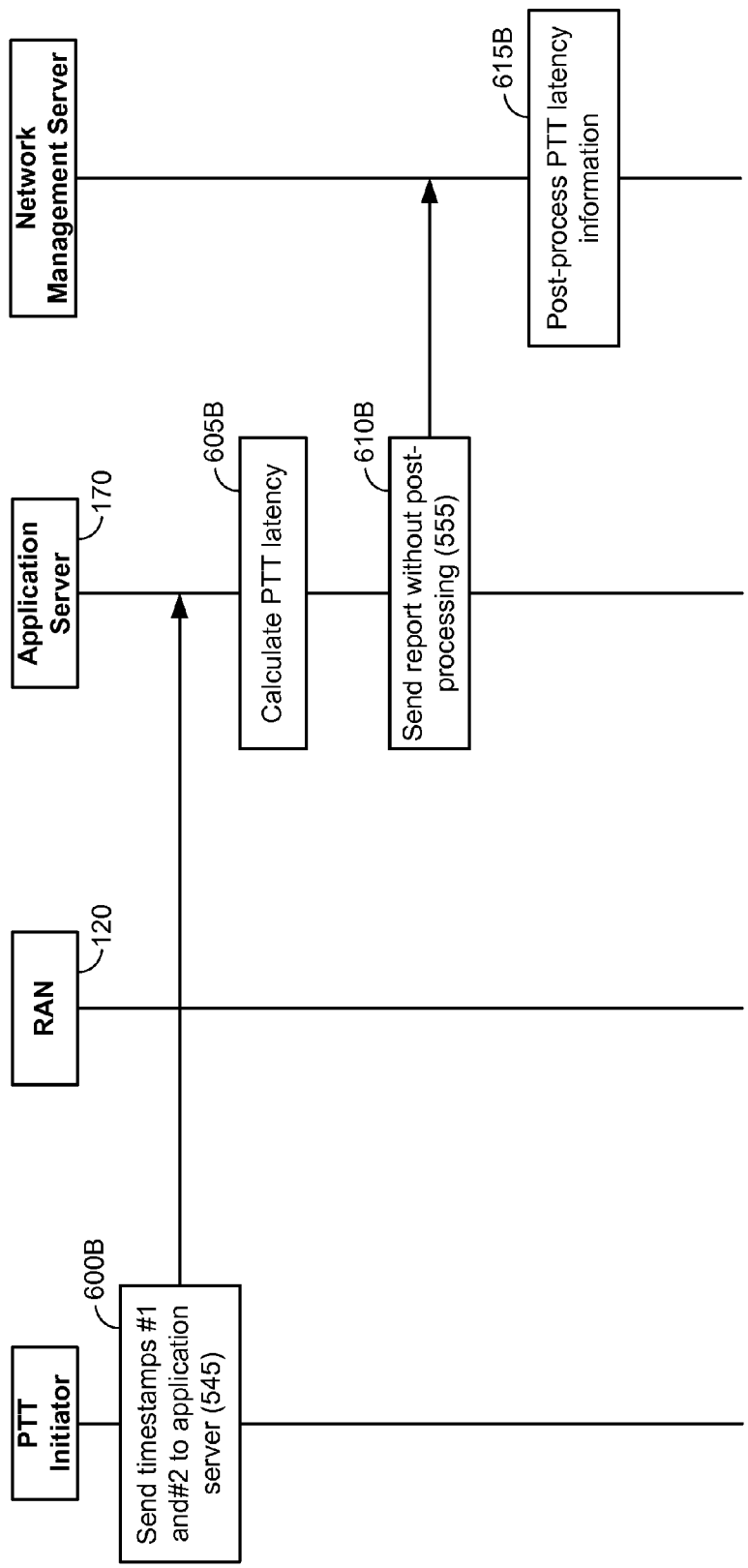

Above, FIG. 6A describes an embodiment where the PTT latency is calculated at the PTT initiator, and post-processing occurs at the application server 170, whereas FIG. 6B describes an embodiment where the PTT latency is calculated at the application server 170, and post-processing occurs at the network management server. In another example, however, the PTT latency can be calculated at the PTT initiator while post-processing can occur at the network management server, or the PTT latency can be calculated at the application server 170 and post-processing may also occur at the application server 170.

In the description of FIG. 5 above, one way by which the PTT initiator may transmit PTT latency information in 545 is via the transmission of first and second timestamps, which are indicative of the PTT button push of 500 and floor grant message receipt of 525, respectively. In FIG. 5, the transmission of the first and second timestamps was described as being included within the transmission of the PTT latency information at 545, which occur sometime after the second timestamp is stored in 530 (e.g., in a floor grant ACK message, at the end of the PTT call, etc.). However, the first and second timestamps need not be bundled together in step 545 of FIG. 5.

Accordingly, FIG. 7 illustrates a modification to the process of FIG. 5, wherein the first timestamp is transmitted within the PTT call request message of 700 (e.g., corresponding to the PTT call request message of 515 in FIG. 5), with the second timestamp being transmitted within the floor grant ACK message of 705 (e.g., corresponding to the floor grant ACK message of 535 of FIG. 5). The first and second timestamps may need not be retained after their respective transmission, and can be erased from memory at the PTT initiator after transmission. Also, while FIG. 7 illustrates the first timestamp being transmitted within the PTT call request message and the second timestamp being transmitted within the floor grant ACK message, it will be appreciated that the first and second timestamps need not be included within these particular signaling messages in other embodiments of the invention. For example, the second timestamp may be transmitted at the end of the PTT call (e.g., with additional call information that becomes available later, such as PTT call duration, etc.), the first timestamp may be transmitted within the floor grant ACK, etc. Thus, the PTT latency information transmission of 545 in FIG. 5 is partitioned in FIG. 7, and occurs at 700 and 705 collectively.

As will be appreciated by one of ordinary skill in the art, the initial PTT latency information reporting protocols according to embodiments of the present invention permit any access terminal operating in accordance with those protocols to inform the application server 170 of PTT latencies via signaling messages performed in-network, contrasted with separate logging apparatuses having to separately upload the logged latency information out of network (e.g., over an Internet connection). Also, the latency information can, in some instances, be provided from the PTT initiator to the application server 170 in near real-time, which increases the responsiveness of the network management server in adapting to the PTT latency feedback. The hardware and personnel costs associated with the process of FIG. 4A/4B can likewise be reduced.

Further, while above-described embodiments are directed to an audio PTT session, it will be appreciated that other embodiments can be directed to any type of PTT session or Push-to-Transfer (PTX) session, wherein non-audio data (e.g., video, text, etc.) data can also be transferred. Thus, "PTT session" is intended to be interpreted broadly, and is not intended to be limited to audio sessions.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating an access terminal configured to report latency information within a wireless communications network, comprising:
   detecting a request to initiate a Push-to-Talk (PTT) session at the access terminal;
   storing first time information indicative of when the request to initiate the PTT session is detected;
   receiving permission to begin the PTT session;
   storing second time information indicative of when the permission is received; and
   sending, from the access terminal, PTT latency information based on the first and second time information, the PTT latency information related to an initial PTT latency of the PTT session.

2. The method of claim 1, wherein the detected request corresponds to a user of the access terminal pushing a PTT button or selecting a PTT option.

3. The method of claim 1, wherein the received permission corresponds to a message granting the access terminal a floor for the PTT session.

4. The method of claim 3, wherein the second time information indicates the time the access terminal receives the grant message.

5. The method of claim 3, wherein the second time information indicates the time at which the access terminal outputs a tone that indicates, to a user of the access terminal, that the access terminal has been granted the floor for the PTT session.

6. The method of claim 1, wherein the sending step sends the first and second time information as the PTT latency information.

7. The method of claim 6, wherein the sending step sends the first and second time information concurrently.

8. The method of claim 6, wherein the sending step sends the first and second time information during PTT call setup.

9. The method of claim 8, wherein the received permission is a floor grant message, the method further comprising:
   transmitting an acknowledgment to the floor grant message,
   wherein the sending step sends the first and second time information within the acknowledgment.

10. The method of claim 6, wherein the sending step sends the first and second time information at different times.

11. The method of claim 10, wherein the first time information is sent within the transmitted request to initiate the PTT session.

12. The method of claim 11, wherein the received permission is a floor grant message, the method further comprising:
    transmitting an acknowledgment to the floor grant message,
    wherein the sending step sends the second time information within the acknowledgment.

13. The method of claim 1, further comprising:
    calculating the initial PTT latency at the access terminal based on the first and second time information,
    wherein the sending step sends the calculated initial PTT latency as the PTT latency information.

14. The method of claim 13, wherein the received permission is a floor grant message, the method further comprising:
    transmitting an acknowledgment to the floor grant message,
    wherein the calculated initial PTT latency is transmitted within the acknowledgment to the floor grant message.

15. The method of claim 13, wherein the sending step further includes:
    encoding the calculated initial PTT latency with a mapping protocol that indicates one of a plurality of latency ranges.

16. The method of claim 1, wherein the sending step sends the PTT latency information within one or more signaling messages of a wireless communication protocol that supports the PTT session.

17. The method of claim 1, wherein the sending step sends (i) device-specific information related to the access terminal and/or (ii) radio information, in addition to the PTT latency information.

18. The method of claim 17, wherein the device-specific information includes a phone type of the access terminal, a firmware version installed at the access terminal, an indication of one or more applications installed at the access terminal and/or whether the access terminal is communicating over a wired or wireless connection.

19. The method of claim 17, wherein the radio information includes a sector identifier of a current sector serving the access terminal, and channel conditions detected by the access terminal.

20. A method of operating a network device configured to acquire latency information within a wireless communications network, comprising:
   receiving a message from a given access terminal to initiate a Push-to-Talk (PTT) session;
   forwarding an announce message to announce the PTT session to a plurality of access terminals;
   receiving at least one acknowledgment to the announce message that indicates an acceptance of the PTT session by at least one of the plurality of access terminals;
   sending a message granting the given access terminal permission to begin the PTT session; and
   receiving, from the given access terminal, PTT latency information related to an initial PTT latency of the PTT session at the given access terminal.

21. The method of claim 20, wherein the message sent by the sending step is a floor grant message that grants the access terminal a floor for the PTT session.

22. The method of claim 20, wherein the PTT latency information includes first time information and second time information, the first time information based on when a request to initiate the PTT session is detected at the given access terminal, and the second time information based on when the given access terminal receives the grant message or when the given access terminal outputs a tone that indicates, to a user of the given access terminal, that the given access terminal has been granted a floor for the PTT session.

23. The method of claim 22, wherein the receiving PTT latency information step receives the first and second time information concurrently.

24. The method of claim 22, wherein the receiving PTT latency information step receives the first and second time information during PTT call setup.

25. The method of claim 24, wherein the message sent by the sending step is a floor grant message, the method further comprising:
   receiving an acknowledgment to the floor grant message from the given access terminal,
   wherein the receiving PTT latency information step receives the first and second time information within the acknowledgment to the floor grant message.

26. The method of claim 22, wherein the receiving PTT latency information step receives the first and second time information at different times.

27. The method of claim 22, wherein the receiving PTT latency information step receives the first time information within the message requesting PTT session initiation.

28. The method of claim 27, wherein the message sent by the sending step is a floor grant message, the method further comprising:
   receiving an acknowledgment to the floor grant message from the given access terminal,
   wherein the receiving PTT latency information step receives the second time information within the acknowledgment to the floor grant message.

29. The method of claim 22, further comprising:
   calculating the initial PTT latency based on the first and second time information.

30. The method of claim 20, wherein the received PTT latency information corresponds to a calculated initial PTT latency at the given access terminal.

31. The method of claim 30, wherein the message sent by the sending step is a floor grant message, the method further comprising:
   receiving an acknowledgment to the floor grant message from the given access terminal,
   wherein the receiving PTT latency information step receives the calculated PTT latency within the floor grant message.

32. The method of claim 30, wherein the calculated PTT latency is encoded with a mapping protocol that indicates one of a plurality of latency ranges.

33. The method of claim 20, wherein the receiving PTT latency information step receives the PTT latency information within one or more signaling messages of a wireless communication protocol that supports the PTT session.

34. The method of claim 20, further comprising:
   generating a PTT latency report based on the received PTT latency information; and
   sending the PTT latency report to a network management server.

35. The method of claim 34, the generating and sending the PTT latency report steps are performed upon receipt of the PTT latency information.

36. The method of claim 34, wherein the generating and sending the PTT latency report steps are performed in response to a request for PTT latency information from the network management server.

37. The method of claim 34, wherein the generating step includes post-processing the received PTT latency information.

38. The method of claim 37, wherein post-processing the received PTT latency information includes generating one or more output metrics that are used by the network management server in evaluating the wireless communications network.

39. The method of claim 34, wherein the generating step does not include post-processing the received PTT latency information, such that the network management server is responsible for post-processing the received PTT latency information.

40. The method of claim 20, wherein the receiving PTT latency information step receives (i) device-specific information related to the given access terminal and/or (ii) radio information, in addition to the PTT latency information.

41. The method of claim 40, wherein the device-specific information includes a phone type of the access terminal, a firmware version installed at the access terminal, an indication of one or more applications installed at the access terminal and/or whether the access terminal is communicating over a wired or wireless connection.

42. The method of claim 40, wherein the radio information includes a sector identifier of a current sector serving the access terminal, and channel conditions detected by the access terminal.

43. An access terminal within a wireless communications network, comprising:
   means for detecting a request to initiate a Push-to-Talk (PTT) session;
   means for storing first time information indicative of when the means for detecting detects the request to initiate the PTT session;
   means for receiving permission to begin the PTT session;
   means for storing second time information indicative of when the means for receiving receives the permission; and
   means for sending, from the access terminal, PTT latency information based on the first and second time information, the PTT latency information related to an initial PTT latency of the PTT session.

44. The access terminal of claim 43, wherein the means for sending sends the first and second time information as the PTT latency information.

45. The access terminal of claim 43, further comprising:
means for calculating the initial PTT latency based on the first and second time information,
wherein the means for sending sends the calculated initial PTT latency as the PTT latency information.

46. The access terminal of claim 43, wherein the means for sending sends the PTT latency information within one or more signaling messages of a wireless communication protocol that supports the PTT session.

47. A network device within a wireless communications network, comprising:
means for receiving a message from a given access terminal to initiate a Push-to-Talk (PTT) session;
means for forwarding an announce message to announce the PTT session to a plurality of access terminals;
means for receiving at least one acknowledgment to the announce message that indicates an acceptance of the PTT session by at least one of the plurality of access terminals;
means for sending a message granting the given access terminal permission to begin the PTT session; and
means for receiving, from the given access terminal, PTT latency information related to an initial PTT latency of the PTT session at the given access terminal.

48. The network device of claim 47, wherein the PTT latency information includes first time information and second time information, the first time information based on when a request to initiate the PTT session is detected at the given access terminal, and the second time information based on when the given access terminal receives the grant message or when the given access terminal outputs a tone that indicates, to a user of the given access terminal, that the given access terminal has been granted a floor for the PTT session.

49. The network device of claim 47, wherein the received PTT latency information corresponds to a calculated initial PTT latency at the given access terminal.

50. The network device of claim 47, wherein the means for receiving PTT latency information receives the PTT latency information within one or more signaling messages of a wireless communication protocol that supports the PTT session.

51. An access terminal within a wireless communications network, comprising:
logic configured to detect a request to initiate a Push-to-Talk (PTT) session;
logic configured to store first time information indicative of when the logic configured to detect detects the request to initiate the PTT session;
logic configured to receive permission to begin the PTT session;
logic configured to store second time information indicative of when the logic configured to receive receives the permission; and
logic configured to send, from the access terminal, PTT latency information based on the first and second time information, the PTT latency information related to an initial PTT latency of the PTT session.

52. The access terminal of claim 51, wherein the logic configured to send sends the first and second time information as the PTT latency information.

53. The access terminal of claim 51, further comprising:
logic configured to calculate the initial PTT latency based on the first and second time information,
wherein the logic configured to send sends the calculated initial PTT latency as the PTT latency information.

54. The access terminal of claim 51, wherein the logic configured to send sends the PTT latency information within one or more signaling messages of a wireless communication protocol that supports the PTT session.

55. A network device within a wireless communications network, comprising:
logic configured to receive a message from a given access terminal to initiate a Push-to-Talk (PTT) session;
logic configured to forward an announce message to announce the PTT session to a plurality of access terminals;
logic configured to receive at least one acknowledgment to the announce message that indicates an acceptance of the PTT session by at least one of the plurality of access terminals;
logic configured to send a message granting the given access terminal permission to begin the PTT session; and
logic configured to receive, from the given access terminal, PTT latency information related to an initial PTT latency of the PTT session at the given access terminal.

56. The network device of claim 55, wherein the PTT latency information includes first time information and second time information, the first time information based on when a request to initiate the PTT session is detected at the given access terminal, and the second time information based on when the given access terminal receives the grant message or when the given access terminal outputs a tone that indicates, to a user of the given access terminal, that the given access terminal has been granted a floor for the PTT session.

57. The network device of claim 55, wherein the received PTT latency information corresponds to a calculated initial PTT latency at the given access terminal.

58. The network device of claim 55, wherein the logic configured to receive PTT latency information receives the PTT latency information within one or more signaling messages of a wireless communication protocol that supports the PTT session.

59. A non-transitory computer-readable medium comprising instructions, which, when executed by an access terminal within a wireless communications network, cause the access terminal to perform operations, the instructions comprising:
program code to detect a request to initiate a Push-to-Talk (PTT) session;
program code to store first time information indicative of when the program code to detect detects the request to initiate the PTT session;
program code to receive permission to begin the PTT session;
program code to store second time information indicative of when the program code to receive receives the permission; and
program code to send, from the access terminal, PTT latency information based on the first and second time information, the PTT latency information related to an initial PTT latency of the PTT session.

60. The non-transitory computer-readable medium of claim 59, wherein the program code to send sends the first and second time information as the PTT latency information.

61. The non-transitory computer-readable medium of claim 59, further comprising:
program code to calculate the initial PTT latency based on the first and second time information, wherein the program code to send sends the calculated initial PTT latency as the PTT latency information.

62. The non-transitory computer-readable medium of claim 59, wherein the program code to send sends the PTT latency information within one or more signaling messages of a wireless communication protocol that supports the PTT session.

63. A non-transitory computer-readable medium comprising instructions, which, when executed by a network device within a wireless communications network, cause the network device to perform operations, the instructions comprising:
- program code to receive a message from a given access terminal to initiate a Push-to-Talk (PTT) session;
- program code to forward an announce message to announce the PTT session to a plurality of access terminals;
- program code to receive at least one acknowledgment to the announce message that indicates an acceptance of the PTT session by at least one of the plurality of access terminals;
- program code to send a message granting the given access terminal permission to begin the PTT session; and
- program code to receive, from the given access terminal, PTT latency information related to an initial PTT latency of the PTT session at the given access terminal.

64. The non-transitory computer-readable medium of claim 63, wherein the PTT latency information includes first time information and second time information, the first time information based on when a request to initiate the PTT session is detected at the given access terminal, and the second time information based on when the given access terminal receives the grant message or when the given access terminal outputs a tone that indicates, to a user of the given access terminal, that the given access terminal has been granted a floor for the PTT session.

65. The non-transitory computer-readable medium of claim 63, wherein the received PTT latency information corresponds to a calculated initial PTT latency at the given access terminal.

66. The non-transitory computer-readable medium of claim 63, wherein the program code to receive PTT latency information receives the PTT latency information within one or more signaling messages of a wireless communication protocol that supports the PTT session.

67. The method of claim 20, wherein the PTT latency information is indicative of a monitored time differential between when a request to initiate the PTT session is detected at the given access terminal and when the given access terminal or a user of the given access terminal is notified of the grant message.

* * * * *